(12) United States Patent
Hu

(10) Patent No.: US 10,289,546 B2
(45) Date of Patent: May 14, 2019

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Chun-Yang Hu, Taoyuan (TW)

(73) Assignee: PHISON ELECTRONICS CORP., Miaoli (TW)

(*) Notice: Subject to any disclaimer, the term of this patent is extended or adjusted under 35 U.S.C. 154(b) by 154 days.

(21) Appl. No.: 15/611,789

(22) Filed: Jun. 2, 2017

(65) Prior Publication Data

US 2018/0300235 A1    Oct. 18, 2018

(30) Foreign Application Priority Data

Apr. 14, 2017   (TW) .............................. 106112480 A

(51) Int. Cl.
*G06F 3/06* (2006.01)
*G06F 12/02* (2006.01)

(52) U.S. Cl.
CPC ........ *G06F 12/0246* (2013.01); *G06F 3/0608* (2013.01); *G06F 3/0652* (2013.01); *G06F 3/0659* (2013.01); *G06F 3/0688* (2013.01); *G06F 2212/2022* (2013.01); *G06F 2212/7205* (2013.01)

(58) Field of Classification Search
CPC .... G06F 3/0608; G06F 3/0652; G06F 3/0659; G06F 3/0688; G06F 12/0246; G06F 2212/2022; G06F 2212/7205
See application file for complete search history.

(56) References Cited

U.S. PATENT DOCUMENTS

| | | | |
|---|---|---|---|
| 8,838,937 B1 * | 9/2014 | Katz | G06F 12/0246 711/103 |
| 9,665,480 B2 * | 5/2017 | Liang | G06F 12/0246 |
| 2007/0233940 A1 * | 10/2007 | Chu | G06F 12/0246 711/103 |

* cited by examiner

*Primary Examiner* — Aracelis Ruiz
(74) *Attorney, Agent, or Firm* — JCIPRNET

(57) ABSTRACT

A memory management method for a rewritable non-volatile memory module having a plurality of physical erasing units is provided. The method includes providing a sequence corresponding to at least part of the physical erasing units; adjusting the sequence by arranging a first physical erasing unit to a first end of the sequence based on an updating time corresponding to the first physical erasing unit; searching the at least part of the physical erasing units based on a searching order for finding at least one second physical erasing unit that meets a data condition, and the searching order indicates an order from a second end of the sequence to the first end of the sequence; and moving valid data stored in the at least one second physical erasing unit. Accordingly, efficiency of the garbage collection operation can be improved.

27 Claims, 9 Drawing Sheets

| Physical erasing unit | 410(0) | 410(5) | 410(6) | 410(7) | 410(4) | 410(3) | 410(2) | 410(1) |
|---|---|---|---|---|---|---|---|---|
| Valid count | 2 | 1 | 1 | 3 | 3 | 100 | 5 | 4 |

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 106112480, filed on Apr. 14, 2017. The entirety of the above-mentioned patent application is hereby incorporated by reference herein and made a part of this specification.

BACKGROUND

Technical Field

The present invention relates to a memory management method, and more particularly, to a memory management method for a rewritable non-volatile memory module, a memory control circuit unit and a memory storage device.

Description of Related Art

The growth of digital cameras, mobile phones, and MP3 players has been rapid in recent years. Consequently, the consumers' demand for storage media has increased tremendously. In recent years, a rewritable non-volatile memory has become a popular part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

In general, the memory storage device can perform a garbage collection operation to release available physical erasing units for writing new data. For example, the traditional garbage collection operation selects one physical erasing unit having the least valid data from the physical erasing units, and copies (or moves) the valid data to another physical erasing unit so as to release the available physical erasing units.

However, whether or not the data stored in one specific physical erasing unit is recently updated is not taken into consideration in the traditional garbage collection operation. If the data stored in one physical erasing unit is recently updated, this may indicate that the valid data stored by such physical erasing unit may be updated again and turned into invalid data. If the garbage collection operation is performed on such physical erasing unit, the valid data may immediately be invalidated after being moved.

Aforesaid issues can be solved though by some memory storage devices with the capability of sorting the physical erasing units based on a programming order of the physical erasing units or an up-to-date level of the valid data and preferentially selecting the physical erasing units not changed over long for the garbage collection operation. Yet, whether or not the data stored in one specific physical erasing unit is recently updated is still left unconsidered. If the data stored in one specific physical erasing unit is recently invalidated and other stored valid data are moved by the garbage collection operation because these valid data belongs to the data not changed over long, these valid data may once again be updated and invalidated, resulting in unnecessary waste of resources.

Nothing herein should be construed as an admission of knowledge in the prior art of any portion of the present invention. Furthermore, citation or identification of any document in this application is not an admission that such document is available as prior art to the present invention, or that any reference focus a part of the common general knowledge in the art.

SUMMARY

The invention is directed to a memory management method, a memory control circuit unit and a memory storage device capable of reducing a probability that the valid data recently moved is immediately updated to become the invalid data and improving efficiency for executing the garbage collection operation.

An exemplary embodiment of the present invention proposes a memory management method for a rewritable non-volatile memory module. The rewritable non-volatile memory module has a plurality of physical erasing units. The memory management method includes: providing a sequence corresponding to at least part of the physical erasing units, wherein the sequence has a first end and a second end; adjusting the sequence by arranging a first physical erasing unit to the first end of the sequence based on an updating time corresponding to the first physical erasing unit; searching the at least part of the physical erasing units based on a searching order for finding at least one second physical erasing unit that meets a data condition, wherein the searching order indicates an order from the second end of the sequence to the first end of the sequence; and moving valid data stored in the at least one second physical erasing unit.

An exemplary embodiment of the present invention proposes a memory control circuit unit, which includes a host system, a memory interface and a memory management circuit. The host interface is configured to couple to a host system. The memory interface is configured to couple to a rewritable non-volatile memory module. The rewritable non-volatile memory module has a plurality of physical erasing units. The memory management circuit is configured to couple to the host interface and the memory interface, and configured to provide a sequence corresponding to at least part of the physical erasing units. The sequence has a first end and a second end. Furthermore, the memory management circuit is further configured to adjust the sequence by arranging a first physical erasing unit to the first end of the sequence based on an updating time corresponding to the first physical erasing unit. In addition, the memory management circuit is further configured to search the at least part of the physical erasing units based on a searching order for finding at least one second physical erasing unit that meets a data condition. The searching order indicates an order from the second end of the sequence to the first end of the sequence. Moreover, the memory management circuit is further configured to move valid data stored in the at least one second physical erasing unit.

An exemplary embodiment of the present invention proposes a memory storage device, which includes a connection interface unit, a rewritable non-volatile memory module and a memory control circuit unit. The connection interface unit is configured to couple to a host system. The rewritable non-volatile memory module has a plurality of physical erasing units. The memory control circuit unit is configured to couple to the connection interface unit and the rewritable non-volatile memory module, and configured to provide a sequence corresponding to at least part of the physical erasing units. The sequence has a first end and a second end. Furthermore, the memory control circuit unit is further configured to adjust the sequence by arranging a first physical erasing unit to the first end of the sequence based on an updating time corresponding to the first physical erasing unit. In addition, the memory control circuit unit is further configured to search the at least part of the physical erasing units based on a searching order for finding at least one second physical erasing unit that meets a data condition. The searching order indicates an order from the second end of the sequence to the first end of the sequence. Moreover, the memory control circuit unit is further configured to move valid data stored in the at least one second physical erasing unit.

Based on the above, in the memory management method, the memory storage device and the memory control circuit unit according to the exemplary embodiments of the present invention, the sequence is generated by sorting the at least part of the physical erasing units, and the sequence is dynamically adjusted by arranging the physical erasing unit recently updated to one end of the sequence. In addition, the physical erasing units available for executing the garbage collection operation is found by sequentially selecting the physical erasing unit from another end of the sequence. As a result, efficiency of the garbage collection operation can be improved.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 is a schematic diagram illustrating a garbage collection operation performed based on a searching order according to an exemplary embodiment.

DESCRIPTION OF THE EMBODIMENTS

Figure 1:
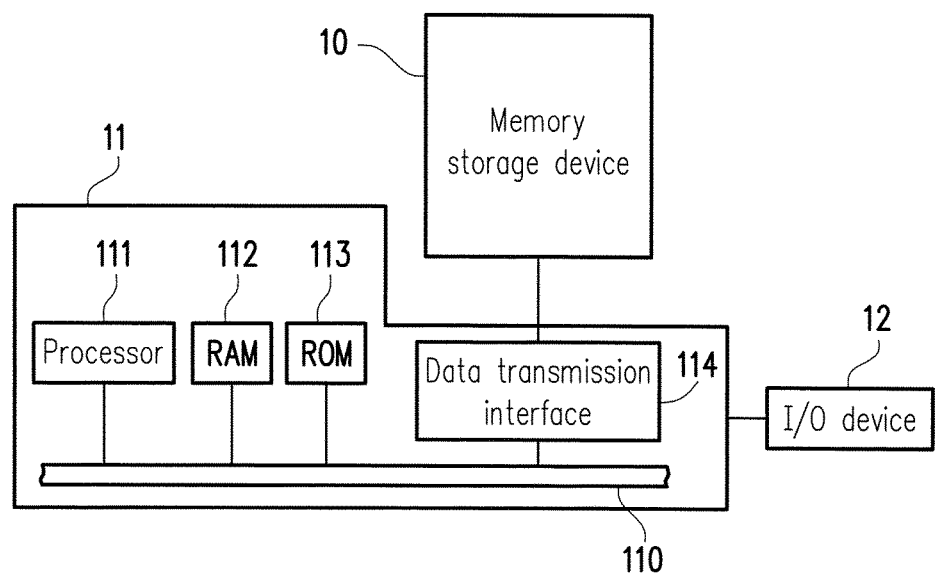
FIG. 1 is a schematic diagram illustrating a host system, a memory storage device and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "one or more" and "at least one" can be used interchangeably herein.

In general, a memory storage device (a.k.a. a memory storage system) includes a rewritable non-volatile memory module and a controller (a.k.a. a control circuit unit). The memory storage device is usually configured together with a host system so the host system can write data into the memory storage device or read data from the memory storage device.

Figure 2:
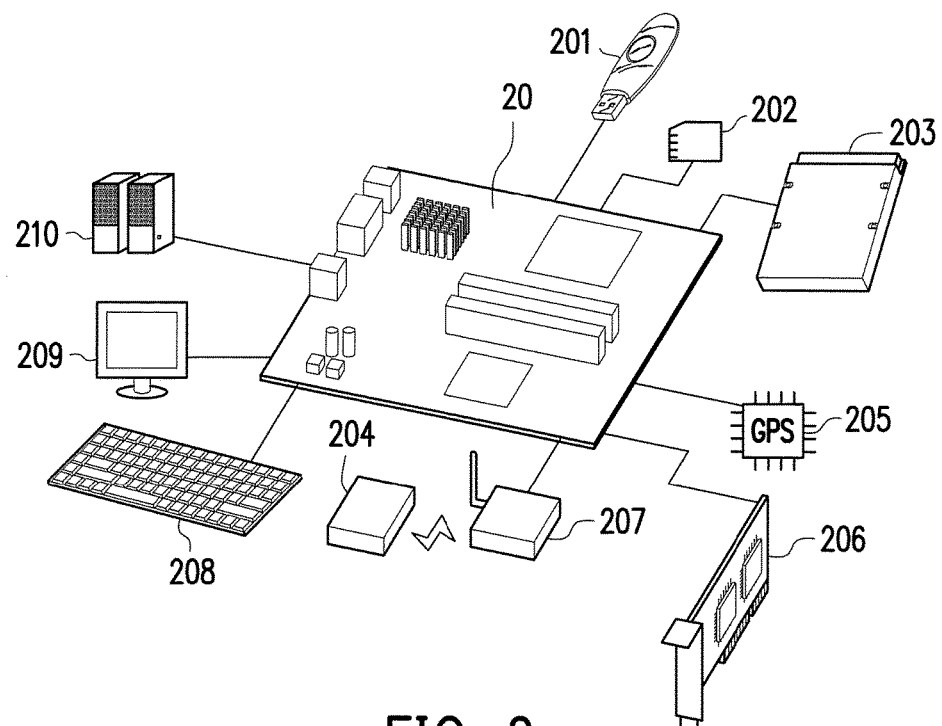
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to an exemplary embodiment, and FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can write data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
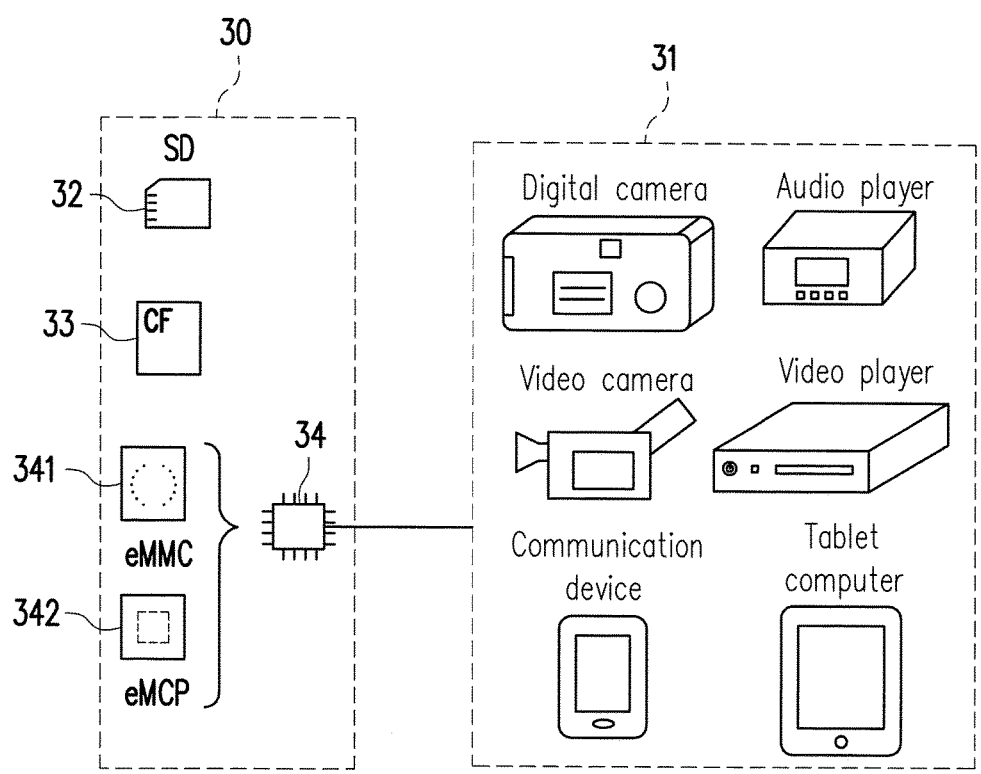
FIG. 3 is a schematic diagram illustrating a host system and a memory storage device according to another exemplary embodiment.

In an exemplary embodiment, aforementioned host system may be any system capable of substantially cooperating with the memory storage device for storing data. Although the host system is illustrated as a computer system in the foregoing exemplary embodiments, nonetheless, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
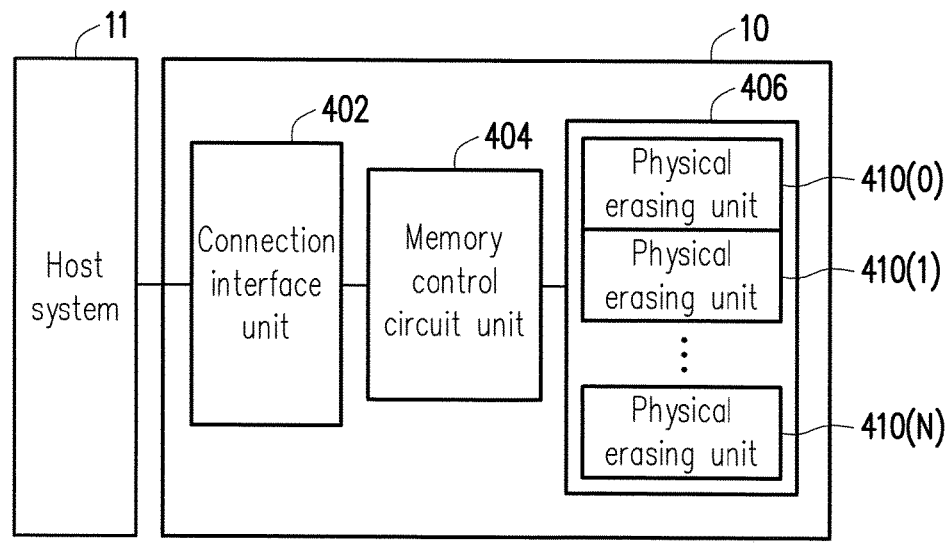
FIG. 4 is a schematic block diagram illustrating a host system and a memory storage device according to an exemplary embodiment.

FIG. 4 is a schematic block diagram illustrating a host system and a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a Secure Digital (SD) interface standard. Nevertheless, it should be understood that the present invention is not limited to the above. The connection interface unit 402 may also be compatible to a SATA (Serial Advanced Technology Attachment) standard, a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control instructions which are implemented in a hardware form or in a firmware form and perform operations such as writing, reading or erasing data in the rewritable non-volatile memory module 406 based on the commands of the host system 11.

The rewritable non-volatile memory module 406 is coupled to the memory control circuit unit 404 and configured to store data written from the host system 11. The rewritable non-volatile memory storage module 406 includes physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the present invention is not limited to the above. Each physical erasing unit may be constituted by 64 physical programming units, 256 physical programming units or any number of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also contain more or less physical access addresses, and the number and the size of the physical access addresses are not limited by the present invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a SLC (Single Level Cell) NAND flash memory module (i.e., a flash memory module capable of storing one data bit in one memory cell). However, the invention is not limited to the above. The rewritable non-volatile memory module 406 may also be a MLC (Multi Level Cell) NAND flash memory module, (i.e., a flash memory module capable of storing two data bits in one memory cell), a TLC (Trinary Level Cell) NAND flash memory module (i.e., a flash memory module capable of storing three data bits in one memory cell), other flash memory modules or any memory module having the same features.

Figure 5:
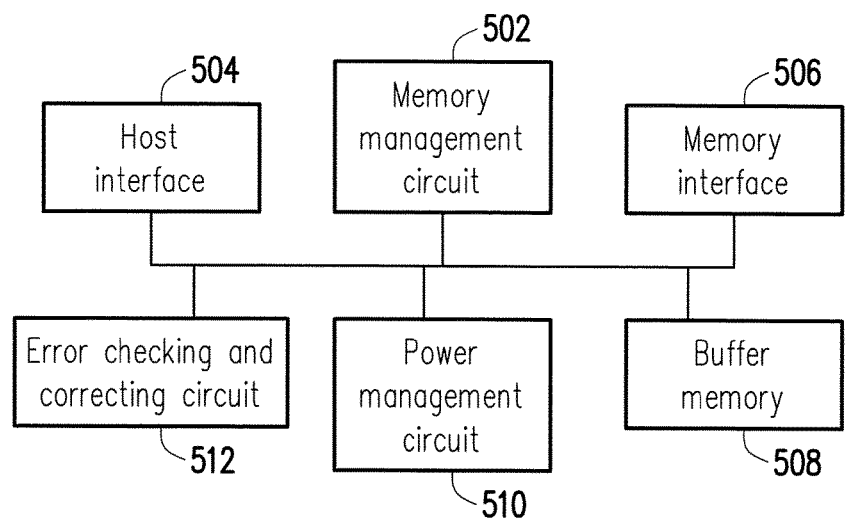
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control instructions and the control instructions are executed to perform various operations such as writing, reading and erasing data during operation of the memory storage device 10.

In the present exemplary embodiment, the control commands of the memory management circuit 502 are implemented in form of firmware. For instance, the memory management circuit 502 has a microprocessor unit (not illustrated) and a read-only memory (not illustrated), and the control instructions are burnt into the read-only memory. During operation of the memory storage device 10, the control instructions are executed by the microprocessor to perform operations of writing, reading or erasing data.

In another exemplary embodiment, the control instructions of the memory management circuit 502 may also be stored, in form of program codes, into a specific area (e.g., a system area in the memory module exclusively for storing the system data) of the rewritable non-volatile memory module 406. In addition, the memory management circuit 502 has a microprocessor unit (not illustrated), a ROM (not illustrated) and a RAM (not illustrated). In particular, the ROM has a boot code, which is executed by the microprocessor unit to load the control instructions stored in the rewritable non-volatile memory module 406 to the RAM of the memory management circuit 502 when the memory control circuit unit 404 is enabled. Then, the control instructions are executed by the microprocessor unit to perform operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to issue a waste command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erase command to the rewritable non-volatile memory module 406 in order to erase data from the rewritable non-volatile memory module 406; and the data processing circuit is configured to process both the data to be written into the rewritable non-volatile memory module 406 and the data read from the rewritable non-volatile memory module 406.

The host interface 504 is coupled to the memory management circuit 502 and configured to couple to the connection interface unit 402, so as to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the present invention is not limited to the above. The host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable to the rewritable non-volatile memory module 406 via the memory interface 506.

In an exemplary embodiment, the memory control circuit unit 404 further includes a buffer memory 508, a power management circuit 510 and an error checking and correcting circuit 512.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting procedure to ensure the data integrity. For example, when a write command is received by the memory management circuit 502 from the host system 11, the error checking and correcting circuit 512 generates an ECC code (error checking and correcting code) for data corresponding to the write command, and the memory management circuit 502 writes the data corresponding to the write command and the ECC code to the rewritable non-volatile memory module 406. Subsequently, the memory management circuit 502 may read the error checking and correcting code corresponding to the data while reading the data from the rewritable non-volatile memory module 406, and the error checking and correcting circuit 512 may execute the error checking and correcting procedure on the read data based on the error checking and correcting code.

In the following description, the operations executed by the memory management circuit 502, the host interface 504, the memory interface 506, the buffer memory 508, the power management circuit 510 and the error checking and correcting circuit 512 may also be referred to as being executed by the memory control circuit unit 404.

Figure 6:
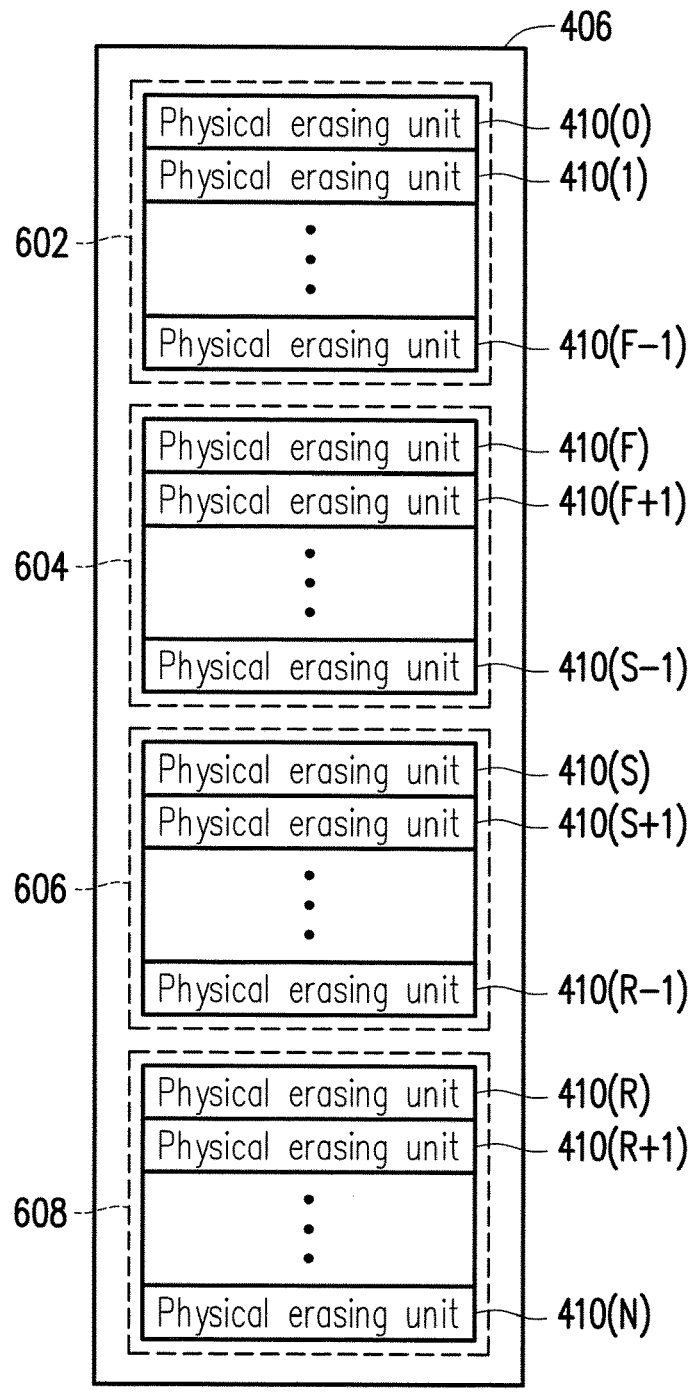
FIG. 6 and FIG. 7 are schematic diagrams illustrating a management of the physical erasing units according to an exemplary embodiment.
Figure 7:
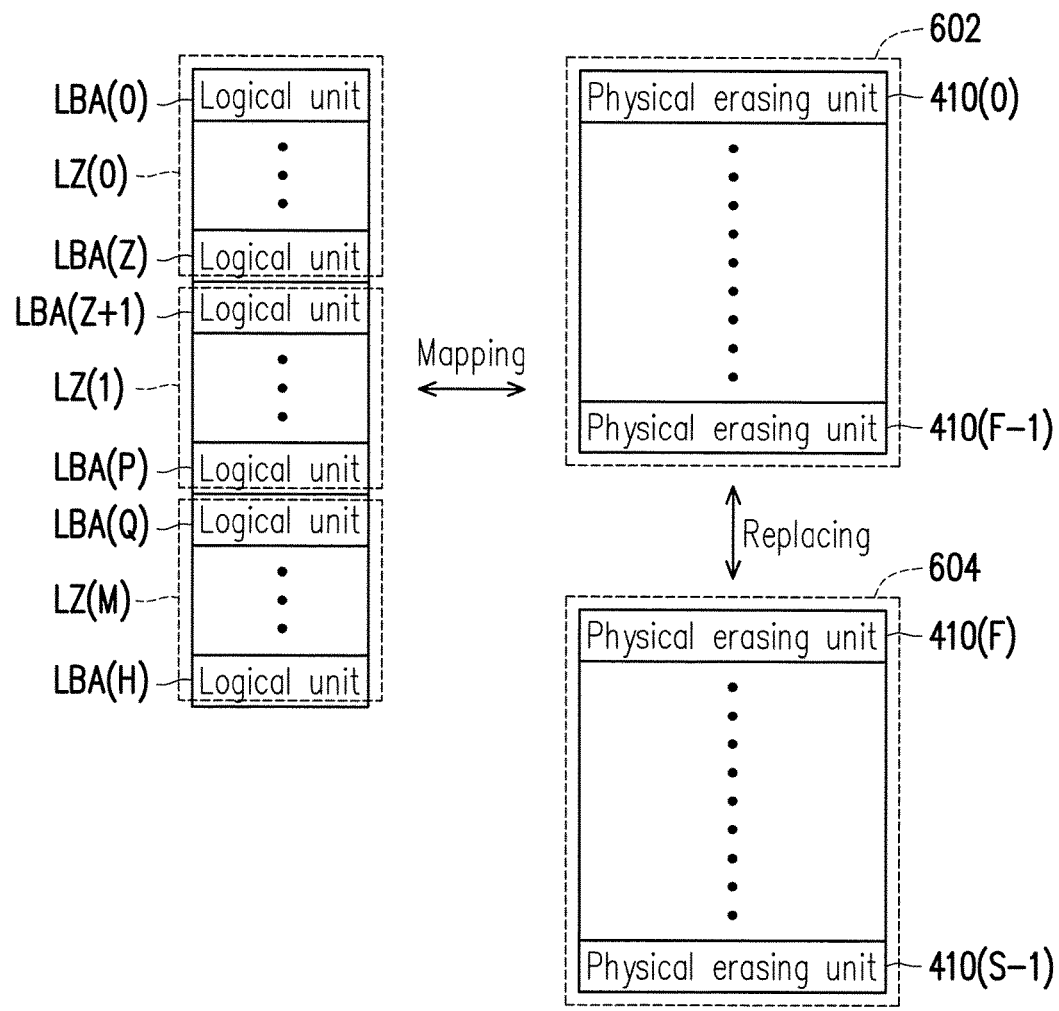

FIG. 6 and FIG. 7 are schematic diagrams illustrating a management of the physical erasing units according to an exemplary embodiment.

It should be understood that terms, such as "retrieve", "select", "group", "divide", "associate" and so forth, are logical concepts which describe operations in the physical erasing units of the rewritable non-volatile memory module 406. In other words, the physical erasing units of the rewritable non-volatile memory module are logically operated so actual positions of the physical units of the rewritable non-volatile memory module are not changed.

Referring to FIG. 6, the memory management circuit 502 logically groups the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management circuit 502 selects the physical erasing units from the spare area 604, and writes the data into the selected physical erasing units for replacing the physical erasing units in the data area 602.

The physical erasing units logically belonging to the system area 606 are used to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if the replacement area 608 still includes normal physical erasing units when the physical erasing units of the data area 602 are damaged, a memory management circuit 502 retrieves the normal physical erasing units from the replacement area 608 for replacing the damaged physical erasing units.

In particular, the numbers of the physical erasing units in the data area 602, the spare area 604, the system area 606 and the replacement area 608 may be different from one another based on the different memory specifications. In addition, it should be understood that, during operation of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 7, the memory management circuit 502 assigns logical units LBA(0) to LBA(H) for mapping to the physical erasing units of the data area 602. Each of the logical units includes a plurality of logical addresses for mapping to the corresponding physical programming units of the physical erasing units. When the host system 11 intends to write data into the logical addresses or update data stored in the logical addresses, the memory management unit 502 retrieves one physical erasing unit from the spare area 604 as an active physical erasing unit to replace the physical erasing units of the data area 602 for writing data. Further, when the physical erasing unit serving as the active physical erasing unit is fully written, the memory management circuit 502 can again retrieve an empty physical erasing unit from the spare area 604 as the active physical erasing unit to continue writing the data corresponding to the write command from the host system 11. Further, when the number of available physical erasing units in the spare area 604 is less than a preset value, the memory management circuit 502 can perform a garbage collection operation (a.k.a. a valid data collection operation) to arrange the valid data in the data area 602, so as to re-associate the physical erasing units not stored with the valid data in the data area 602 to the spare area 604.

In order to identify the physical erasing units to which the data of each logical unit is being stored to, the memory management circuit 502 may record the mapping relations between the logical addresses and the physical programming units in the present exemplary embodiment. For instance, in the present exemplary embodiment, the memory management circuit 502 stores logical-physical mapping tables into the rewritable non-volatile memory module 406 for recording the physical programming unit mapping to each logical address. When intending to access the data, the memory management circuit 502 loads the logical-physical mapping table to the buffer memory 508 for maintenance and then writes or reads the data based on the logical-physical mapping table.

It should be noted that, the buffer memory 508 is unable to store the mapping table recording the mapping relations of all the logical addresses due to limited capacity. Therefore, in the present exemplary embodiment, the memory management unit 502 groups the logical units LBA(0) to LBA(H) into a plurality of logical zones LZ(0) to LZ(M) and assigns one logical-physical mapping table for each of the logical zones. In particular, when the memory management unit 502 intends to update the mapping of one specific logical unit, the logical-physical mapping table corresponding to the logical zone to which the logical unit belongs may be loaded into the buffer memory 508 for updating. Specifically, if the logical-physical mapping table corresponding to the logical zone to which the specific logical unit belongs is not temporarily stored in the buffer memory 508 (i.e., mapping of the logical unit to be updated is not recorded in the logical-physical mapping table temporarily stored in the buffer memory 508), the memory management circuit 502 can perform a mapping table swapping operation to restore the current logical-physical mapping table temporarily stored in the buffer memory 508 back to the rewritable non-volatile memory module 406, and loads the logical-physical mapping table recorded with mapping of the logical unit to be updated into the buffer memory 508.

The physical erasing units 410(0) to 410(F−1) in the data area 602 are also known as non-spare physical erasing units, and the physical erasing units 410(F) to 410(S−1) in the spare area 604 are also known as spare physical erasing units.

In the present exemplary embodiment, the memory management circuit 502 generates a sequence after sorting based on updating times of at least part of the physical erasing units 410(0) to 410(N). The at least part of the physical erasing units may be the non-spare physical erasing units. In the present exemplary embodiment, the non-spare physical erasing units refer to the physical erasing units stored with data and associated to the data area 602. The updating time refers to a time when the data stored in a non-spare physical erasing unit is updated. For example, when a physical programming unit in one specific non-spare physical erasing unit is marked as in an invalid state, it means that the data of that specific non-spare physical erasing unit is updated, and the updating time of that specific non-spare physical erasing unit is also the time when the data is updated. For instance, when the host system 11 sends the write command which indicates writing data to one specific logical address, the memory management circuit 502 finds the non-spare physical erasing unit mapping to that specific logical address based on the logical-physical mapping table, and marks old data stored in such non-spare physical erasing unit as invalid data. Accordingly, the updating time of the non-spare physical erasing unit may be a time when the old data stored in the non-spare physical erasing unit is marked as the invalid data. Further, the memory management circuit 502 writes new data into another physical erasing unit based on the write command received from the host system 11. In an exemplary embodiment, the memory management circuit 502 may record an updating time for each physical programming unit of each physical erasing unit, and a latest updating time among the updating times of all the physical programming units is marked as the updating time of the respective physical erasing unit. Herein, the physical programming unit having the latest updating time represents the physical programming unit that is recently updated.

In other words, when the host system 11 sends the write command which indicates writing the data into the logical address mapping to one specific non-spare physical erasing unit, the memory management circuit 502 updates that specific non-spare physical erasing unit so that specific non-spare physical erasing unit may include the latest updating time. Then, the memory management circuit 502 dynamically adjusts a sequence for an arrangement corresponding to all the non-spare physical erasing units based on the updated non-spare physical erasing units.

Figure 8:
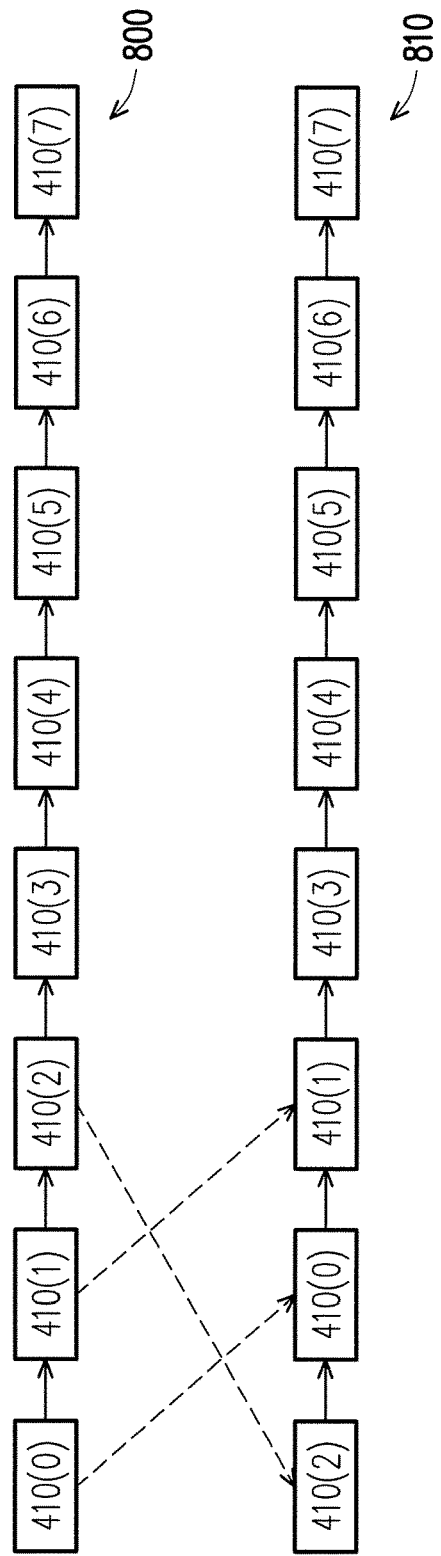
FIG. 8 illustrates a schematic diagram for sorting non-spare physical erasing units based on updating times according to an exemplary embodiment.

FIG. 8 illustrates a schematic diagram for sorting non-spare physical erasing units based on updating times according to an exemplary embodiment.

With reference to FIG. 8, it is assumed that the physical erasing units 410(0) to 410(7) are the non-spare physical erasing units stored with data, i.e., all the physical programming units in the physical erasing units 410(0) to 410(7) are stored with the valid data or the invalid data. It should be noted, although the present exemplary embodiment is described with the physical erasing units 410(0) to 410(7) as the non-spare physical erasing units for example, a number of the non-spare physical erasing units included by the rewritable non-volatile memory module 406 may be more or less in actual operation.

As shown in FIG. 8, the memory management circuit 502 generates a sequence 800 by sorting the physical erasing units 410(0) to 410(7) based on the updating times. In the present exemplary embodiment, the updating time of one specific non-spare physical erasing unit is a time when the data stored in one physical programming unit of that specific non-spare physical erasing unit is marked as the invalid data. The sequence 800 may be a serially-connected structure formed after connecting the sorted physical erasing units 410(0) to 410(7) together in series by the memory management circuit 502 utilizing a pointer or a flag. In other words, the sequence 800 is a logical serially-connected relation instead of a physical serially-connected relation. The sequence 800 has a first end and a second end, where the first end corresponds to the leftmost of the sequence 800 and the second end corresponds to the rightmost of the sequence 800. When the data of one specific non-spare physical erasing unit is updated, that specific non-spare physical erasing unit is the non-spare physical erasing unit that is recently updated to include the latest updating time. In the present exemplary embodiment, during operation of sorting the non-spare physical erasing units, the memory management circuit 502 arranges the recently updated non-spare physical erasing unit to the first end of the sequence 800, and correspondingly adjusts an order relation among the non-spare physical erasing units in the sequence 800 (e.g., adjusting the serially-connected relation among the non-spare physical erasing units). In this way, the non-spare physical erasing units not updated over long gradually can be moved close to the second end of the sequence 800 in terms of arranged positions. After said sorting operation lasts for a period of time, the non-spare physical erasing unit not changed over the longest time is arranged to the second end of the sequence 800. In the present exemplary embodiment, the non-spare physical erasing unit not changed over the longest time includes the oldest updating time. Therefore, the physical erasing units 410(0) to 410(7) are sequentially arranged between the first end and the second end of the sequence 800 based on an order from the latest updating time to the oldest updating time. In other words, the physical erasing unit 410(0) is the non-spare physical erasing unit recently updated, and the physical erasing unit 410(7) is the non-spare physical erasing unit not changed over the longest time.

It is assumed herein that the memory management circuit 502 receives a write command from the host system 11, and the write command indicates writing one data into one specific logical address mapping to the physical erasing unit 410(2). The memory management circuit 502 marks the data stored in the physical programming unit mapping to that specific logical address in the physical erasing unit 410(2) as the invalid data. At this time, the physical erasing unit 410(2) is the non-spare physical erasing unit recently updated to include the latest updating time. In an exemplary embodiment, the memory management circuit 502 may also express the stored data as the invalid data by marking the physical programming unit mapping to that specific logical address as in the invalid state. Next, the memory management circuit 502 arranges the physical erasing unit 410(2) to the first end of the sequence 800 (i.e., at the leftmost) and generates a sequence 810 by adjusting the order relation in the sequence 800. For example, the memory management circuit 502 adjusts the physical erasing unit 410(0) and the physical erasing unit 410(1) originally arranged on the left of the physical erasing unit 410(2) to the right of the physical erasing unit 410(2), whereas the order of the physical erasing units 410(3) to 410(7) originally arranged on the right of the physical erasing unit 410(2) remains unchanged. In other words, in the sequence 810, the physical erasing unit 410(2) is arranged to the first end of the sequence 810 (i.e., at the leftmost), the physical erasing unit 410(0) is arranged closely to the right of the physical erasing unit 410(2), and the physical erasing unit 410(1) is arranged closely to the right of the physical erasing unit 410(0). Then, the memory management circuit 502 writes the data indicated by the write command into another physical erasing unit, and updates mapping of said another physical erasing unit. In the present exemplary embodiment, said another physical erasing unit may be the physical erasing unit other than the physical erasing units 410(0) to 410(7). By adjusting the sequence in the manner of arranging the non-spare physical erasing unit recently updated to the first end of the sequence, the non-spare physical erasing unit not changed over the longest time can be arranged to the second end of the sequence. In other words, in the sequence corresponding to the sorted non-spare physical erasing units, when the updating time of one specific non-spare physical erasing unit is newer than the most of the non-spare physical erasing units (i.e., the updating time of that specific non-spare physical erasing unit is closer to the current system time than the updating times of the most of the non-spare physical erasing units), that specific non-spare physical erasing unit is closer to the first end than the most of the non-spare physical erasing units.

In the exemplary embodiment where the updating time refers to the time when the valid data is marked as the invalid data, when the updating time of one specific non-spare physical erasing unit is comparatively new (i.e., comparatively closing to the current system time), it means that the data stored in that specific non-spare physical erasing unit is recently invalidated due to updating, such that there is a higher probability that the other valid data stored in that specific non-spare physical erasing unit may be updated recently. By contrast, when the updating time of one specific non-spare physical erasing unit is comparatively old, it means that the valid data stored in that specific non-spare physical erasing unit is not changed over long, such that there is a lower probability that the other valid data stored in that specific non-spare physical erasing unit may be updated recently. In the present exemplary embodiment, when a number of the spare physical erasing units in the spare area 604 is less than the preset value, the memory management circuit 502 preferentially selects the non-spare physical erasing units with the older updating times for the garbage collection operation.

Specifically, the memory management circuit 502 determines a searching order based on the sorted non-spare physical erasing units, and searches the non-spare physical erasing units based on the searching order for finding the non-spare physical erasing unit that meets a data condition (a.k.a. a second physical erasing unit).

In the present exemplary embodiment, the searching order indicates an order from the second end (e.g., the rightmost) to the first end (e.g., the leftmost) of the sequence (e.g., the sequence 800 or the sequence 810) corresponding to the sorted non-spare physical erasing units. In the sequence corresponding to the sorted non-spare physical erasing units, it is given that the order from the first end to the second end corresponds to an arranged order of the non-spare physical erasing units from the latest updating time to the oldest updating time. Therefore, the order from the second end to the first end corresponds to an arranged order of the non-spare physical erasing units from the oldest updating time to the latest updating time. In other words, the searching order is the order starting with the non-spare physical erasing unit not changed over the longest time.

In particular, the memory management circuit 502 selects one non-spare physical erasing unit from the sequence as a candidate physical erasing unit based on the searching order. If a valid count of the candidate physical erasing unit is less than a threshold, the memory management circuit 502 determines that the candidate physical erasing unit meets the data condition and determines the candidate physical erasing unit is the second physical erasing unit aforementioned. Here, the valid count is a number of the physical programming units stored with valid data in one physical erasing unit. Then, the memory management circuit 502 moves or copies the valid data stored in the candidate physical erasing unit to another physical erasing unit (a.k.a. a third physical erasing unit) and performs an erasing operation on the candidate physical erasing unit. In the present exemplary embodiment, the third physical erasing unit may be the physical erasing unit other than the physical erasing units 410(0) to 410(7).

FIG. 9 is a schematic diagram illustrating a garbage collection operation performed based on a searching order according to an exemplary embodiment. For illustrative convenience, the schematic diagram for the sequence corresponding to the sorted non-spare physical erasing units is illustrated in a table form in the exemplary embodiment of FIG. 9, but the present invention is not limited thereto.

With reference to FIG. 9, it is assumed that the non-spare physical erasing units of the data area 602 include the physical erasing units 410(0) to 410(7), and the memory management circuit 502 generates a corresponding sequence 900 by sorting the physical erasing units 410(0) to 410(7) based on the updating times of the physical erasing units 410(0) to 410(7). In the sequence 900, the physical erasing unit 410(0) at the leftmost has the updating time being the newest, the physical erasing unit 410(5) at the second from the left has the updating time older than the updating time of the physical erasing unit 410(0) but newer than the updating time of the physical erasing unit 410(6) at the third from the left, and the physical erasing unit 410(1) at the rightmost has the updating time being the oldest. The searching order indicates an order of the physical erasing unit 410(1), the physical erasing unit 410(2), the physical erasing unit 410(3), the physical erasing unit 410(4), the physical erasing unit 410(7), the physical erasing unit 410(6), the physical erasing unit 410(5) and the physical erasing unit 410(0). Accordingly, the memory management circuit 502 sequentially selects the candidate physical erasing unit starting from the physical erasing unit 410(1).

When the number of the spare physical erasing units is less than or equal to a preset number, the memory management circuit 502 starts the garbage collection operation. First of all, the memory management circuit 502 selects the physical erasing unit 410(1) at the rightmost in the sequence 900 as the candidate physical erasing unit. It is assumed herein that the threshold is 5, and the valid count of the physical erasing unit 410(0) is 4. In this case, the memory management circuit 502 determines that the valid count of the physical erasing unit 410(1) is less than the threshold, and thus determines that the physical erasing unit 410(1) meets the data condition. Then, the memory management circuit moves or copies the valid data stored in the physical erasing unit 410(1) to another physical erasing unit, and erases the physical erasing unit 410(1) to release the physical erasing unit 410(1) as the spare physical erasing unit.

Next, if the number of the spare physical erasing units is greater than the preset number, the memory management circuit 502 may end the garbage collection operation. However, if the number of the spare physical erasing units is less than or equal to the preset number, the memory management circuit 502 sequentially selects the physical erasing unit 410(2) subsequent to the physical erasing unit 410(1) as the candidate physical erasing unit based on the searching order. It is assumed herein that the valid count of the physical erasing unit 410(2) is 5. In this case, the memory management circuit 502 determines that the valid count of the physical erasing unit 410(2) is not less than the threshold, and thus determines that the physical erasing unit 410(2) does not meet the data condition. Therefore, the memory management circuit 502 sequentially selects the physical erasing unit 410(3) subsequent to the physical erasing unit 410(2) as the candidate physical erasing unit based on the searching order. It is assumed herein that the valid count of the physical erasing unit 410(3) is 100. In this case, the memory management circuit 502 determines that the valid count of the physical erasing unit 410(3) is not less than the threshold, and thus determines that the physical erasing unit 410(3) does not meet the data condition. Therefore, the memory management circuit 502 sequentially selects the physical erasing unit 410(4) subsequent to the physical erasing unit 410(3) as the candidate physical erasing unit based on the searching order. It is assumed herein that the valid count of the physical erasing unit 410(4) is 3. In this case, the memory management circuit 502 determines that the valid count of the physical erasing unit 410(4) is less than the threshold, and thus determines that the physical erasing unit 410(4) meets the data condition. Then, the memory management circuit 502 copies the valid data stored in the physical erasing unit 410(4) to another physical erasing unit, and erases the physical erasing unit 410(4) to release the physical erasing unit 410(4) as the spare physical erasing unit.

In the exemplary embodiment described above, the memory management circuit 502 may also copy the valid data stored in the non-spare physical erasing units that meet the data condition to the buffer memory 508 for temporarily storage. When the collected valid data reach a sufficient data volume (e.g., equal to a maximum data volume storable by one physical erasing unit), the valid data temporarily stored in the buffer memory 508 are written altogether into one physical erasing unit retrieved from the spare area.

In other words, the memory management circuit 502 may continuously search the non-spare physical erasing unit that meets the data condition based on the searching order, so as to release a sufficient number of the non-spare physical erasing units.

In an exemplary embodiment, the physical erasing unit recently updated is excluded from being selected as the second physical erasing unit (i.e., the non-spare physical erasing unit that meets the data condition). For example, the memory management circuit 502 can determine whether the candidate physical erasing unit is the physical erasing unit recently updated by determining whether the candidate physical erasing unit is the physical erasing unit arranged to the first end of the sequence. For instance, when the physical erasing unit 410(0) is selected as the candidate physical erasing unit, the memory management circuit 502 determines that the physical erasing unit 410(0) is the physical erasing unit arranged to the first end of the sequence 900 and thus determines that the physical erasing unit 410(0) is the physical erasing unit recently updated. Therefore, the memory management circuit 502 does not determine the physical erasing unit 410(0) as the second physical erasing unit but re-selects the physical erasing unit 410(1) as the candidate physical erasing unit. Alternatively, the memory management circuit 502 may not select the physical erasing unit recently updated as the candidate physical erasing unit. For instance, after the physical erasing unit 410(5) is selected as the candidate physical erasing unit, the memory management circuit 502 may ignore the physical erasing unit 410(0) and re-select the physical erasing unit 410(1) as the candidate physical erasing unit.

In addition, the memory management circuit 502 also updates the sequence 900 by deleting one or more released non-spare physical erasing units in the sequence 900. For example, after the physical erasing unit 410(1) is released, the memory management circuit 502 updates the sequence 900 by deleting the physical erasing unit 410(1) of the sequence 900. That is to say, in the updated sequence 900, the physical erasing unit 410(2) is arranged to the rightmost. However, if the number of the spare physical erasing units is less than or equal to the preset number after the non-spare physical erasing units in the sequence 900 are all searched, the memory management circuit 502 adjusts the threshold from a first value to a second value and re-selects the physical erasing unit at the rightmost again. The second value is greater than the first value. For example, the memory management circuit 502 may adjust the threshold from 5 to 6, and then re-select the physical erasing unit at the rightmost (e.g., the physical erasing unit 410(2)) as the candidate physical erasing unit. Then, the memory management circuit 502 determines the non-spare physical erasing unit that meets the data condition based on the new threshold.

When the garbage collection operation is started, the memory management circuit 502 may use a preset initial value as the threshold for the determining operation on the valid count, and adjusts the threshold based on aforementioned situations before the current garbage collection operation is ended. After the current garbage collection operation is ended, the memory management circuit 502 can use the preset initial value as the threshold again in the next garbage collection operation.

Figure 10:
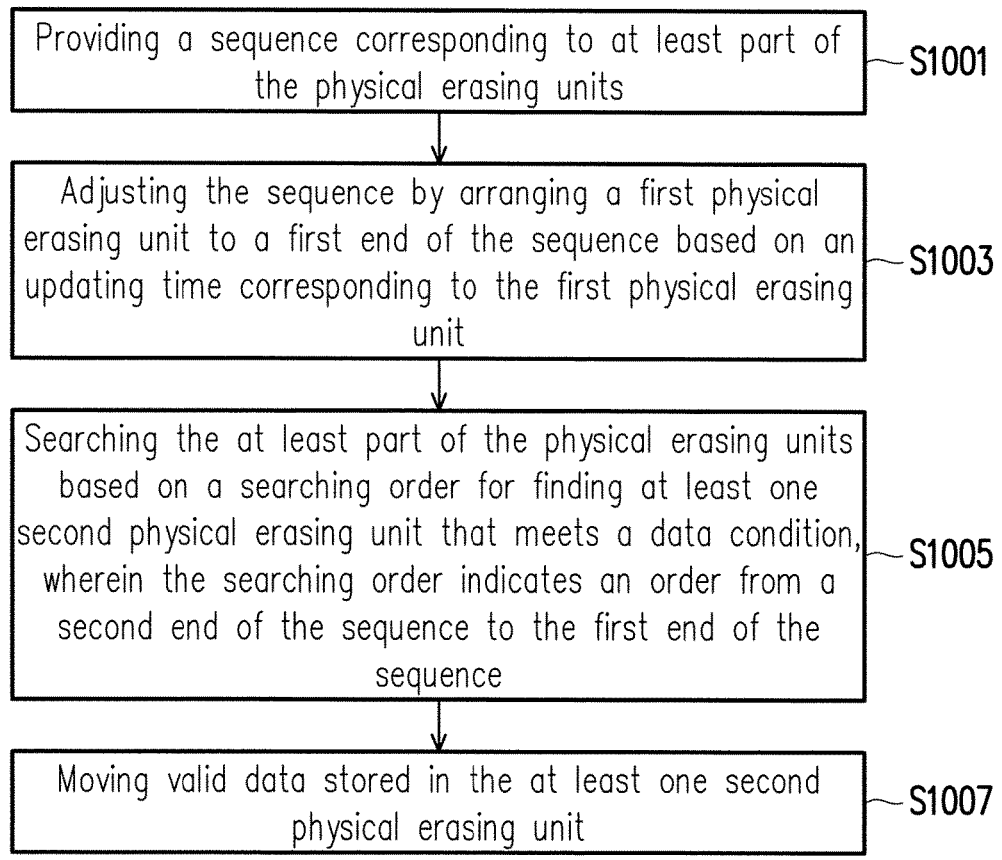
FIG. 10 is a flowchart illustrating a memory management method according to an exemplary embodiment.

FIG. 10 is a flowchart illustrating a memory management method according to an exemplary embodiment.

With Reference to FIG. 10, in step S1001, the memory management circuit 502 provides a sequence corresponding to at least part of the physical erasing units. The sequence has a first end and a second end. In step S1003, the memory management circuit 502 adjusts the sequence by arranging a first physical erasing unit to the first end of the sequence based on an updating time corresponding to the first physical erasing unit. As described above, the memory management circuit 502 may provide the sequence by sorting the at least part of the physical erasing units based on the updating times of the at least part of the physical erasing units. In the present exemplary embodiment, the first physical erasing unit is the physical erasing unit recently updated to include the latest updating time among the at least part of the physical erasing units. During operation of the memory storage device 10, the memory storage device 502 dynamically adjusts the sequence by arranging the first physical erasing unit recently updated to the first end of the sequence.

In step S1005, the memory management circuit 502 searches the at least part of the physical erasing units based on a searching order for finding at least one second physical erasing unit that meets a data condition, where the searching order indicates an order from a second end of the sequence to the first end of the sequence. In this step, the memory management circuit 502 searches for the at least one second physical erasing unit that meets the data condition, preferentially starting from the physical erasing unit not changed for the longest time (i.e., the physical erasing unit having the oldest updating time). In step S1007, the memory management circuit 502 moves valid data stored in the at least one second physical erasing unit. For example, the memory management circuit 502 copies the valid data stored in the at least one second physical unit to one physical erasing unit retrieved from the spare area. In addition, after step S1007, the memory management circuit 502 can perform an erasing operation on the at least one second physical erasing unit.

Details regarding each step in FIG. 10 have been described in the foregoing embodiments, and thus related descriptions are not repeated hereinafter.

Figure 11:
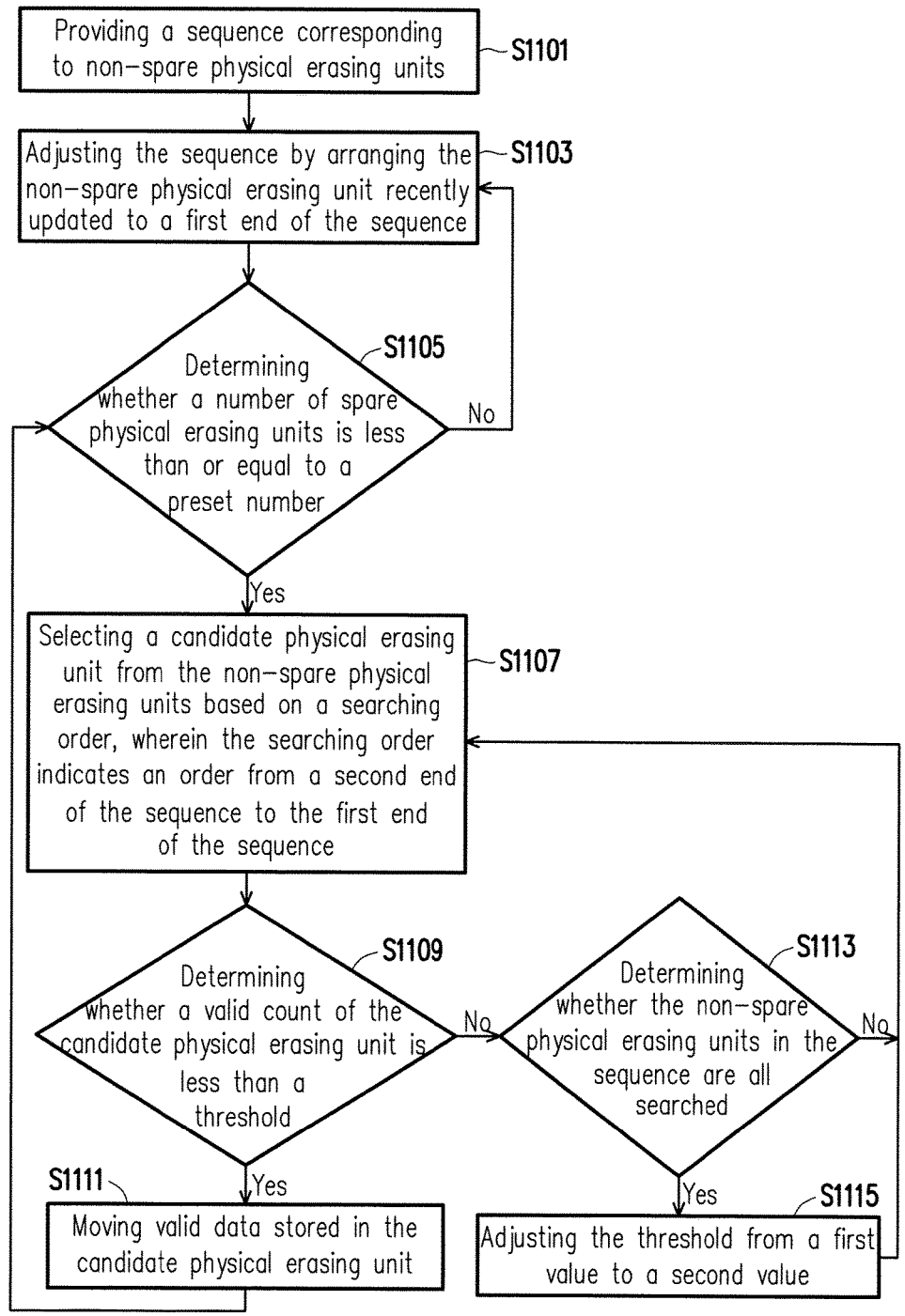
FIG. 11 is a flowchart illustrating a memory management method according to another exemplary embodiment.

FIG. 11 is a flowchart illustrating a memory management method according to another exemplary embodiment.

With reference to FIG. 11 in step S1101, the memory management circuit 502 provides a sequence corresponding to non-spare physical erasing units. In step S1103, the memory management circuit 502 adjusts the sequence by arranging the non-spare physical erasing unit recently updated to a first end of the sequence.

In step S1105, the memory management circuit 502 determines whether a number of spare physical erasing units is less than or equal to a preset number. If the number of the spare physical erasing unit is not less than or equal to the preset number, the memory management circuit 502 continues to execute step S1103.

On the other hand, if the number of the spare physical erasing unit is less than or equal to the preset number, the memory management circuit 502 executes step S1107. In step S1107, the memory management circuit 502 selects a candidate physical erasing unit from the non-spare physical erasing units based on a searching order, wherein the searching order indicates an order from a second end of the sequence to the first end of the sequence.

Next, in step S1109, the memory management circuit 502 determines whether a valid count of the candidate physical erasing unit is less than a threshold. If the valid count of the candidate physical erasing unit is less than the threshold, the memory management circuit 502 determines the candidate physical erasing unit is the second physical erasing unit aforementioned and executes step S1111. In step S1111, the memory management circuit 502 moves valid data stored in the candidate physical erasing unit. Then, the memory management circuit 502 may continue to execute step S1105.

On the other hand, if the valid count of the candidate physical erasing unit is not less than the threshold, the memory management circuit 502 executes step S1113. In step S1113, the memory management circuit 502 determines whether the non-spare physical erasing units in the sequence are all searched. For example, the memory management circuit 502 may determine whether the non-spare physical erasing units in the sequence are all searched by determining whether the candidate physical erasing unit is the physical erasing unit arranged to the first end of the sequence. If the candidate physical erasing unit is the physical erasing unit arranged to the first end of the sequence, the memory management circuit 502 determines that the non-spare physical erasing units in the sequence are all searched. If the candidate physical erasing unit is not the physical erasing unit arranged to the first end of the sequence, the memory management circuit 502 determines that the non-spare physical erasing units in the sequence are not all searched.

When the non-spare physical erasing units in the sequence are not all searched, the memory management circuit 502 executes step S1107 to select the next physical erasing unit as the candidate physical erasing unit. Further, when the non-spare physical erasing units in the sequence are all searched (e.g., when the candidate physical erasing unit is the physical erasing unit arranged to the first end of the sequence), the memory management circuit 502 executes step S1115. In step S1115, the memory management circuit 502 adjusts the threshold from a first value to a second value. Then, the memory management circuit 502 executes step S1107 to re-select the candidate physical erasing unit. At that time, because the non-spare physical erasing units in the sequence are all searched, the memory management circuit 502 re-selects the physical erasing unit arranged to the second end of the sequence as the candidate physical erasing unit.

In summary, with the memory management method, the memory storage device and the memory control circuit unit proposed according to the exemplary embodiments of the invention, the corresponding sequence is generated by sorting the non-spare physical erasing units based on the updating times of the non-spare physical erasing units, and the corresponding sequence is dynamically adjusted by arranging the non-spare physical erasing unit recently updated to one end of the sequence. By doing so, the non-spare physical erasing unit not changed over long can be gradually arranged to another end of the corresponding sequence. Moreover, the non-spare physical erasing unit available as the target for executing the garbage collection operation may be found by sequentially selecting the non-spare physical erasing unit from said another end of the corresponding sequence. As a result, the probability that the valid data recently moved is immediately updated to become the invalid data can be reduced and efficiency for executing the garbage collection operation can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, the rewritable non-volatile memory module comprising a plurality of physical erasing units, the memory management method comprising:
   providing a sequence corresponding to at least part of the physical erasing units, wherein the sequence has a first end and a second end;
   adjusting the sequence by arranging a first physical erasing unit to the first end of the sequence based on an updating time corresponding to the first physical erasing unit;
   searching the at least part of the physical erasing units based on a searching order for finding at least one second physical erasing unit that meets a data condition, wherein the searching order indicates an order from the second end of the sequence to the first end of the sequence; and
   moving valid data stored in the at least one second physical erasing unit.

2. The memory management method according to claim 1, wherein the first physical erasing unit is excluded from being selected as the at least one second physical erasing unit.

3. The memory management method according to claim 1, wherein the step of adjusting the sequence by arranging the first physical erasing unit to the first end of the sequence based on the updating time corresponding to the first physical erasing unit comprises:
   receiving a write command, wherein the write command indicates writing first data to a logical address, and the logical address maps to the first physical erasing unit;
   updating the first physical erasing unit based on the write command; and
   arranging the first physical erasing unit to the first end of the sequence.

4. The memory management method according to claim 3, wherein the step of updating the first physical erasing unit based on the write command comprises:
   writing the first data into one physical erasing unit among the physical erasing units; and
   marking second data stored in the first physical erasing unit as invalid data,
   wherein the first physical erasing unit is one physical erasing unit among the at least part of the physical erasing units.

5. The memory management method according to claim 1, further comprising:
   determining whether a number of spare physical erasing units among the physical erasing units is less than or equal to a preset number,
   wherein the step of searching the at least part of the physical erasing units based on the searching order for finding the at least one second physical erasing unit that meets the data condition is performed when the number of the spare physical erasing units among the physical erasing units is less than or equal to the preset number.

6. The memory management method according to claim 1, wherein the step of searching the at least part of the physical erasing units based on the searching order for finding the at least one second physical erasing unit that meets the data condition comprises:
   selecting a first candidate physical erasing unit from the at least part of the physical erasing units based on the searching order;

determining that the first candidate physical erasing unit is the at least one second physical erasing unit if the first candidate physical erasing unit meets the data condition;

selecting a physical erasing unit subsequent to the first candidate physical erasing unit from the at least part of the physical erasing units as a second candidate physical erasing unit based on the searching order if the first candidate physical erasing unit does not meet the data condition; and determining that the second candidate physical erasing unit is the at least one second physical erasing unit if the second candidate physical erasing unit meets the data condition.

7. The memory management method according to claim 6, wherein the data condition is a valid count of one physical erasing unit being less than a threshold, wherein the step of searching the at least part of the physical erasing units based on the searching order for finding the at least one second physical erasing unit that meets the data condition further comprises:

when the at least part of the physical erasing units are all searched, adjusting the threshold from a first value to a second value, and performing the step of searching the at least part of the physical erasing units based on the searching order for finding the at least one second physical erasing unit that meets the data condition again.

8. The memory management method according to claim 7, wherein the second value is greater than the first value.

9. The memory management method according to claim 1, wherein the step of moving the valid data stored in the at least one second physical erasing unit comprises:

moving the valid data stored in the at least one second physical erasing unit to a third physical erasing unit among the physical erasing units, wherein the memory management method further comprises:

erasing the at least one second physical erasing unit.

10. A memory control circuit unit, comprising:

a host interface, configured to couple to a host system;

a memory interface, configured to couple to a rewritable non-volatile memory module, wherein the rewritable non-volatile memory module comprises a plurality of physical erasing units; and a memory management circuit, configured to couple to the host interface and the memory interface, wherein the memory management circuit is configured to provide a sequence corresponding to at least part of the physical erasing units, wherein the sequence has a first end and a second end, wherein the memory management circuit is further configured to adjust the sequence by arranging a first physical erasing unit to the first end of the sequence based on an updating time corresponding to the first physical erasing unit, wherein the memory management circuit is further configured to search the at least part of the physical erasing units based on a searching order for finding at least one second physical erasing unit that meets a data condition, wherein the searching order indicates an order from the second end of the sequence to the first end of the sequence, wherein the memory management circuit is further configured to move valid data stored in the at least one second physical erasing unit.

11. The memory control circuit unit according to claim 10, wherein the first physical erasing unit is excluded from being selected as the at least one second physical erasing unit.

12. The memory control circuit unit according to claim 10, wherein the operation of adjusting the sequence by arranging the first physical erasing unit to the first end of the sequence based on the updating time corresponding to the first physical erasing unit by the memory management circuit comprises:

receiving a write command, wherein the write command indicates writing first data to a logical address, and the logical address maps to the first physical erasing unit;

updating the first physical erasing unit based on the write command; and arranging the first physical erasing unit to the first end of the sequence.

13. The memory control circuit unit according to claim 12, wherein the operation of updating the first physical erasing unit based on the write command by the memory management circuit comprises:

writing the first data into one physical erasing unit among the physical erasing units, and marking second data stored in the first physical erasing unit as invalid data, wherein the first physical erasing unit is one physical erasing unit among the at least part of the physical erasing units.

14. The memory control circuit unit according to claim 10, wherein the memory management circuit is further configured to determine whether a number of spare physical erasing units among the physical erasing units is less than or equal to a preset number, wherein the memory management circuit performs the operation of searching the at least part of the physical erasing units based on the searching order for finding the at least one second physical erasing unit that meets the data condition when the number of the spare physical erasing units among the physical erasing units is less than or equal to the preset number.

15. The memory control circuit unit according to claim 10, wherein the operation of searching the at least part of the physical erasing units based on the searching order for finding the at least one second physical erasing unit that meets the data condition by the memory management circuit comprises:

selecting a first candidate physical erasing unit from the at least part of the physical erasing units based on the searching order;

determining that the first candidate physical erasing unit is the at least one second physical erasing unit if the first candidate physical erasing unit meets the data condition;

selecting a physical erasing unit subsequent to the first candidate physical erasing unit from the at least part of the physical erasing units as a second candidate physical erasing unit based on the searching order if the first candidate physical erasing unit does not meet the data condition; and determining that the second candidate physical erasing unit is the at least one second physical erasing unit if the second candidate physical erasing unit meets the data condition.

16. The memory control circuit unit according to claim 15, wherein the data condition is a valid count of one physical erasing unit being less than a threshold, wherein the operation of searching the at least part of the physical erasing units based on the searching order for finding the at least one second physical erasing unit that meets the data condition by the memory management circuit further comprises:
when the at least part of the physical erasing units are all searched, adjusting the threshold from a first value to a second value, and performing the operation of searching the at least part of the physical erasing units based on the searching order for finding the at least one second physical erasing unit that meets the data condition again.

17. The memory control circuit unit according to claim 16, wherein the second value is greater than the first value.

18. The memory control circuit unit according to claim 10, wherein the operation of moving the valid data stored in the at least one second physical erasing unit by the memory management circuit comprises:
moving the valid data stored in the at least one second physical erasing unit to a third physical erasing unit among the physical erasing units,
wherein the memory management circuit is further configured to erase the at least one second physical erasing unit.

19. A memory storage device, comprising:
a connection interface unit, configured to couple to a host system;
a rewritable non-volatile memory module, comprising a plurality of physical erasing units; and
a memory control circuit unit, configured to couple to the connection interface unit and the rewritable non-volatile memory module,
wherein the memory control circuit unit is configured to provide a sequence corresponding to at least part of the physical erasing units, wherein the sequence has a first end and a second end,
wherein the memory control circuit unit is further configured to adjust the sequence by arranging a first physical erasing unit to the first end of the sequence based on an updating time corresponding to the first physical erasing unit,
wherein the memory control circuit unit is further configured to search the at least part of the physical erasing units based on a searching order for finding at least one second physical erasing unit that meets a data condition, wherein the searching order indicates an order from the second end of the sequence to the first end of the sequence,
wherein the memory control circuit unit is further configured to move valid data stored in the at least one second physical erasing unit.

20. The memory storage device according to claim 19, wherein the first physical erasing unit is excluded from being selected as the at least one second physical erasing unit.

21. The memory storage device according to claim 19, wherein the operation of adjusting the sequence by arranging the first physical erasing unit to the first end of the sequence based on the updating time corresponding to the first physical erasing unit by the memory control circuit unit comprises:
receiving a write command, wherein the write command indicates writing first data to a logical address, and the logical address maps to the first physical erasing unit;
updating the first physical erasing unit based on the write command; and
arranging the first physical erasing unit to the first end of the sequence.

22. The memory storage device according to claim 21, wherein the operation of updating the first physical erasing unit based on the write command by the memory control circuit unit comprises:
writing the first data into one physical erasing unit among the physical erasing units, and marking second data stored in the first physical erasing unit as invalid data,
wherein the first physical erasing unit is one physical erasing unit among the at least part of the physical erasing units.

23. The memory storage device according to claim 19, wherein the memory control circuit unit is further configured to determine whether a number of spare physical erasing units among the physical erasing units is less than or equal to a preset number,
wherein the memory control circuit unit performs the operation of searching the at least part of the physical erasing units based on the searching order for finding the at least one second physical erasing unit that meets the data condition when the number of the spare physical erasing units among the physical erasing units is less than or equal to the preset number.

24. The memory storage device according to claim 19, wherein the operation of searching the at least part of the physical erasing units based on the searching order for finding the at least one second physical erasing unit that meets the data condition by the memory control circuit unit comprises:
selecting a first candidate physical erasing unit from the at least part of the physical erasing units based on the searching order;
determining that the first candidate physical erasing unit is the at least one second physical erasing unit if the first candidate physical erasing unit meets the data condition;
selecting a physical erasing unit subsequent to the first candidate physical erasing unit from the at least part of the physical erasing units as a second candidate physical erasing unit based on the searching order if the first candidate physical erasing unit does not meet the data condition; and
determining that the second candidate physical erasing unit is the at least one second physical erasing unit if the second candidate physical erasing unit meets the data condition.

25. The memory storage device according to claim 24, wherein the data condition is a valid count of one physical erasing unit being less than a threshold,
wherein the operation of searching the at least part of the physical erasing units based on the searching order for finding the at least one second physical erasing unit that meets the data condition by the memory control circuit unit further comprises:
when the at least part of the physical erasing units are all searched, adjusting the threshold from a first value to a second value, and performing the operation of searching the at least part of the physical erasing units based on the searching order for finding the at least one second physical erasing unit that meets the data condition again.

26. The memory storage device according to claim 25, wherein the second value is greater than the first value.

27. The memory storage device according to claim 19, wherein the operation of moving the valid data stored in the at least one second physical erasing unit by the memory control circuit unit comprises:

moving the valid data stored in the at least one second physical erasing unit to a third physical erasing unit among the physical erasing units,
wherein the memory control circuit unit is further configured to erase the at least one second physical erasing unit.

* * * * *